(12) United States Patent
Akamine et al.

(10) Patent No.: US 12,105,186 B2
(45) Date of Patent: Oct. 1, 2024

(54) OBJECT TRACKING DEVICE

(71) Applicant: DENSO CORPORATION, Kariya (JP)

(72) Inventors: Yusuke Akamine, Nisshin (JP); Akiyoshi Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 17/659,151

(22) Filed: Apr. 13, 2022

(65) Prior Publication Data

US 2022/0236402 A1 Jul. 28, 2022

Related U.S. Application Data

(63) Continuation of application No. PCT/JP2020/038150, filed on Oct. 8, 2020.

(30) Foreign Application Priority Data

Oct. 15, 2019 (JP) .................... 2019-188667

(51) Int. Cl.
*G01S 13/72* (2006.01)
*G01S 7/41* (2006.01)
*G01S 13/931* (2020.01)

(52) U.S. Cl.
CPC ............ *G01S 13/723* (2013.01); *G01S 7/412* (2013.01); *G01S 7/415* (2013.01); *G01S 13/931* (2013.01)

(58) Field of Classification Search
CPC ........ G01S 13/723; G01S 7/412; G01S 7/415; G01S 13/931
See application file for complete search history.

(56) References Cited

U.S. PATENT DOCUMENTS

| | | | |
|---|---|---|---|
| 9,381,916 B1* | 7/2016 | Zhu .................. | B60W 30/0956 |
| 2006/0274149 A1* | 12/2006 | Yoshizawa ................ | G01S 3/20 |
| | | | 348/148 |
| 2008/0111730 A1* | 5/2008 | Ding ..................... | G01S 13/726 |
| | | | 342/90 |
| 2009/0192710 A1* | 7/2009 | Eidehall ............ | B60W 50/0097 |
| | | | 701/300 |
| 2009/0201192 A1* | 8/2009 | Tokoro .................. | G01S 13/867 |
| | | | 342/70 |
| 2011/0295549 A1* | 12/2011 | Takabayashi .......... | G01S 13/86 |
| | | | 702/142 |
| 2013/0335261 A1* | 12/2013 | Kajiki ................... | G01S 13/931 |
| | | | 342/107 |
| 2015/0054673 A1* | 2/2015 | Baba ..................... | G01S 13/931 |
| | | | 342/27 |
| 2018/0095103 A1* | 4/2018 | Hirai ....................... | G01S 13/42 |
| 2018/0211536 A1* | 7/2018 | Akamine ............... | G08G 1/166 |
| 2018/0217232 A1* | 8/2018 | Miyazaki .............. | G01S 13/584 |

(Continued)

FOREIGN PATENT DOCUMENTS

JP 3629328 B2 3/2005

*Primary Examiner* — Peter M Bythrow
(74) *Attorney, Agent, or Firm* — MASCHOFF BRENNAN

(57) ABSTRACT

An object tracking device according to one aspect of the present disclosure includes a detection unit, a prediction unit, a first region setting unit, an estimation unit, a registration unit, a prohibition region setting unit, and a registration prohibition unit. The registration prohibition unit prohibits observed values of at least one observed value detected by the detection unit and that are within a prohibition region set by the prohibition region setting unit from being registered as new targets by the registration unit.

10 Claims, 9 Drawing Sheets

(56) References Cited

U.S. PATENT DOCUMENTS

| | | | | |
|---|---|---|---|---|
| 2018/0354506 A1* | 12/2018 | Minemura | ............ | G01S 13/867 |
| 2018/0370529 A1* | 12/2018 | Matsunaga | ............ | B60W 50/14 |
| 2019/0179002 A1* | 6/2019 | Takayama | ............. | G01S 13/726 |
| 2020/0269877 A1* | 8/2020 | Mortazavi | ............ | G08G 1/0129 |

* cited by examiner

FIG.7
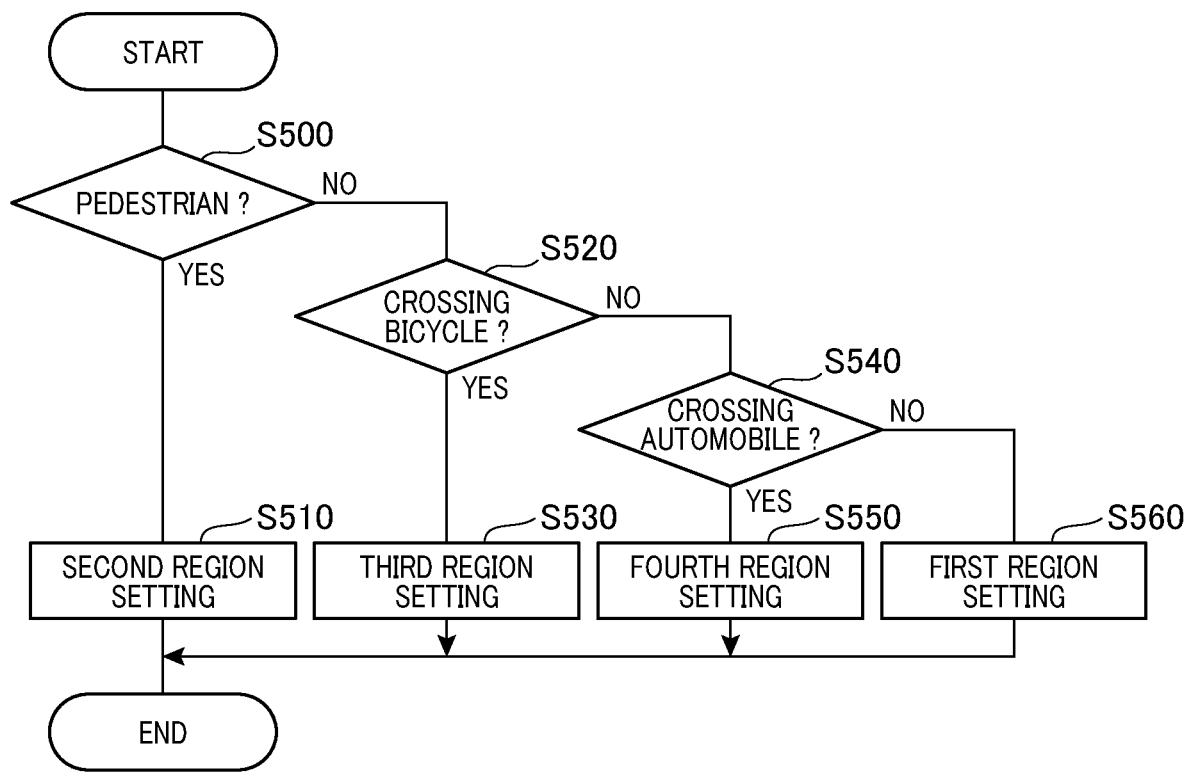
FIG. 8
FIG.8
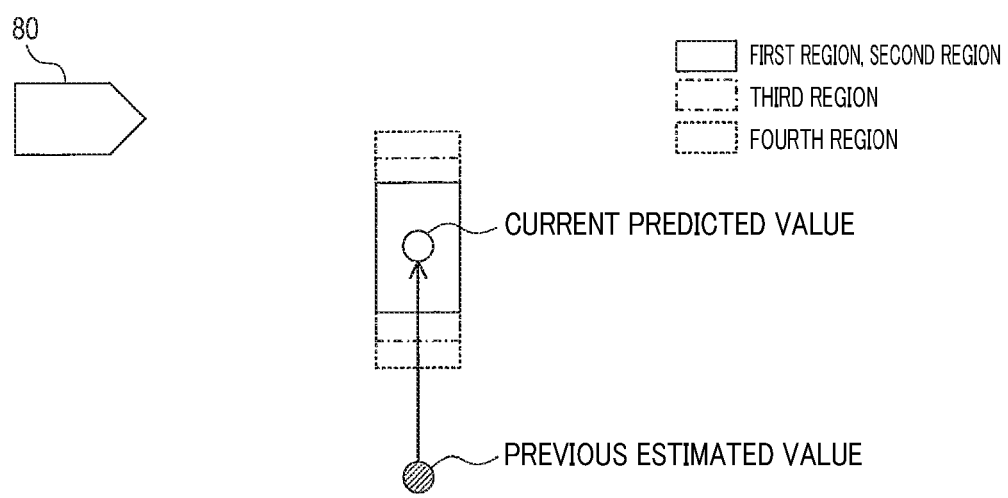

OBJECT TRACKING DEVICE

CROSS-REFERENCE TO RELATED APPLICATION

This application is the U.S. bypass application of International Application No. PCT/JP2020/038150 filed on Oct. 8, 2020, which designated the U.S. and claims priority to Japanese Patent Application No. 2019-188667 filed on Oct. 15, 2019, the contents of both of which are incorporated herein by reference.

TECHNICAL FIELD

The present disclosure relates to an object tracking device for tracking an object.

BACKGROUND

A target motion estimation device as described in JP 3629328 B generates a target based on a radar signal from a radar device, and performs tracking of the target. More specifically, the above device calculates a predicted value for the position of a target in a current processing cycle based on an estimated value of the target in a previous processing cycle, and sets a prediction gate centered on the predicted value. The above device then, from among observed values of observed positions in the current cycle, correlates an observed value that is within the set prediction gate and that is closest to the predicted value with the predicted value, and calculates an estimated value in the current processing cycle based on the correlated observed value and the predicted value. In this kind of device for tracking an object, when there is an observed value that is not correlated with the predicted value, that observed value is handled as a new target.

SUMMARY

An object tracking device according to one aspect of the present disclosure estimates a state quantity of at least one target for each preset processing cycle, and includes: a detection unit, a prediction unit, a first region setting unit, a selection unit, an estimation unit, a registration unit, a prohibition region setting unit, and a registration prohibition unit. The detection unit is configured to detect at least one observed value from an observation signal observed by a sensor. At least one observed value is information about at least one target around a vehicle. The prediction unit is configured to calculate a predicted value of a current state quantity from an estimated value of a past state quantity for each target included in the at least one target. The first region setting unit is configured to set a first region based on the predicted value for each predicted value calculated by the prediction unit. The first region is a region where it is estimated an observed value will be obtained this time. The selection unit is configured to select an observed value from at least one observed value detected by the detection unit for each of the predicted values calculated by the prediction unit, the observed value being within the first region set by the first region setting unit. The estimation unit is configured to calculate the estimated value of the current state quantity based on the observed value selected by the selection unit for each predicted value calculated by the prediction unit. The registration unit is configured to register the observed value of at least one observed value detected by the detection unit that is not correlated with any predicted value as a new target. The prohibition region setting unit is configured to set a prohibition region for each predicted value calculated by the prediction unit. The prohibition region is a region where observed values are prohibited from being registered as new targets. The registration prohibition unit is configured to prohibit the observed values of at least one observed value detected by the detection unit within the prohibition region set by the prohibition region setting unit from being registered as new targets by the registration unit.

BRIEF DESCRIPTION OF THE DRAWINGS

The above features of the present disclosure will be made clearer by the following detailed description, given referring to the appended drawings. In the accompanying drawings:

FIG. 7 is a flowchart of a subroutine illustrating a prohibition region setting process according to the second embodiment;

FIG. 8 is a diagram illustrating an example of first to fourth regions that are the prohibition region for prohibiting registration of a new target according to the second embodiment;

DETAILED DESCRIPTION OF THE PREFERRED EMBODIMENTS

Figure 1:
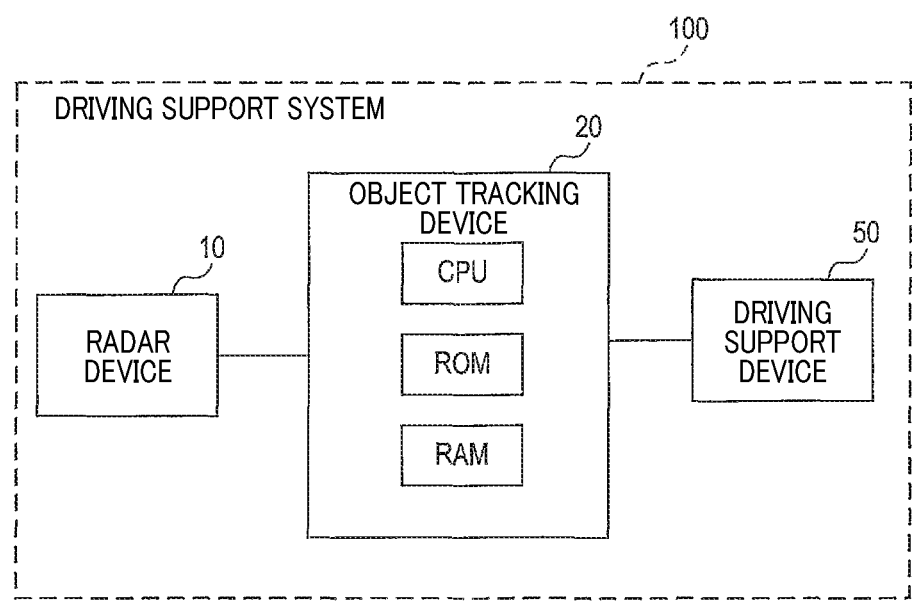
FIG. 1 is a block diagram illustrating the configuration of an object tracking device according to a first embodiment.

In a case of using a high-resolution radar, by obtaining a plurality of observed values from the same object, a plurality of targets may be generated from the same object. As a result of detailed examination, the inventors discovered a problem in that in a case where in a processing cycle following a processing cycle in which a plurality of targets are generated, when the number of obtained observations becomes less than the number of recognized targets, competition for observed values occurs between the targets currently being tracked and generated from the same object and new targets. When an observed value is correlated with a new target as a result of the occurrence of competition for the observed value, it is no longer possible to continue to track the target that is currently being tracked, and tracking of a new target will begin.

On the other hand, as a driving support system for a vehicle, there are driving support systems in which the longer that tracking of a target continues, the reliability of the tracking result increases, and when the reliability becomes equal to or greater than a threshold value, the tracking result is used for performing control of the vehicle. In such driving support systems, when the tracking of a target is lost and tracking has to begin again, a delay in vehicle control may result.

One aspect of the present disclosure is that it is desirable to be able to stably track a target.

An object tracking device according to one aspect of the present disclosure estimates a state quantity of at least one target for each preset processing cycle, and includes: a detection unit, a prediction unit, a first region setting unit, a selection unit, an estimation unit, a registration unit, a prohibition region setting unit, and a registration prohibition unit. The detection unit is configured to detect at least one observed value from an observation signal observed by a sensor. At least one observed value is information about at least one target around a vehicle. The prediction unit is configured to calculate a predicted value of a current state quantity from an estimated value of a past state quantity for each target included in the at least one target. The first region setting unit is configured to set a first region based on the predicted value for each predicted value calculated by the prediction unit. The first region is a region where it is estimated an observed value will be obtained this time. The selection unit is configured to select an observed value from at least one observed value detected by the detection unit for each of the predicted values calculated by the prediction unit, the observed value being within the first region set by the first region setting unit. The estimation unit is configured to calculate the estimated value of the current state quantity based on the observed value selected by the selection unit for each predicted value calculated by the prediction unit. The registration unit is configured to register the observed value of at least one observed value detected by the detection unit that is not correlated with any predicted value as a new target. The prohibition region setting unit is configured to set a prohibition region for each predicted value calculated by the prediction unit. The prohibition region is a region where observed values are prohibited from being registered as new targets. The registration prohibition unit is configured to prohibit the observed values of at least one observed value detected by the detection unit within the prohibition region set by the prohibition region setting unit from being registered as new targets by the registration unit.

According to an aspect of the present disclosure, for each target, a predicted value for the current state quantity is calculated based on an estimated value of the past state quantity, and for each calculated predicted value, a first region is set based on the predicted value. Then, of acquired observed values detected for each predicted value, an observed value is selected from among the observed values within the first region to be correlated with the predicted value, and based on the selected observed value and predicted value, an estimated value is calculated for the current state quantity. Furthermore, a prohibition region is set for each predicted value, and of the acquired observed values, an observed value that is not correlated with any of the predicted values and that is outside the prohibition region is registered as a new target. On the other hand, even in the case of an observed value that is not correlated with any predicted value, there is a high probability that an observed value that is within the prohibition region was observed from the same object as an observed value that is correlated with a predicted value. Accordingly, an observed value that is within the prohibition region is prohibited from being registered as a new target. Therefore, it is possible to prohibit the generation of a plurality of targets from the same object. As a result, it is possible to stably track a target.

In the following, exemplary embodiments for implementing the present disclosure will be described with reference to the drawings.

First Embodiment 1-1. Configuration

First, the configuration of a driving support system 100 according to the present embodiment will be described with reference to FIG. 1. The driving support system 100 includes a radar device 10, an object tracking device 20, and a driving support device 50.

The radar device 10 may be mounted in the center of the front (for example, the center of the front bumper) of a vehicle 80, and may have a region in the center of the front of the vehicle 80 as a detection region. Moreover, a radar device 10 may be mounted on both the left front side and the right front side (for example the left end and right end of the front bumper) of the vehicle 80, and may have both the front on the left and the front on the right of the vehicle 80 as detection regions. Furthermore, a radar device 10 may be mounted on both the left rear side and the right rear side (for example the left end and right end of the rear bumper) of the vehicle 80, and may have both the rear on the left and the rear on the right of the vehicle 80 as detection regions. Not all of these five radar devices 10 need be mounted in the vehicle 80. It is possible to mount only one of the five radar devices 10 in the vehicle 80, and it is also possible to mount two or more of the five radar devices 10 in the vehicle.

The radar device 10 is a high-resolution millimeter wave radar. The radar device 10 has a transmitting array antenna that includes a plurality of antenna elements, and a receiving array antenna that includes a plurality of antenna elements. The radar device 10 repeatedly transmits a transmission wave at a specified cycle, and receives the reflected wave that is generated by reflecting the transmission wave by the object. Furthermore, the radar device 10 generates a beat signal by mixing the transmission wave and the reflected wave, and outputs a sampled beat signal (in other words, observation signal) to the object tracking device 20. The radar device 10 may use any modulation method such as the FMCW method, multi-frequency CW method, or the like.

The object tracking device 20 includes a microcomputer having a CPU, and a semiconductor memory such as ROM, RAM or the like. The object tracking device 20 achieves various functions by the CPU executing various programs stored in the ROM. More specifically, as illustrated by the solid lines in FIG. 2, the object tracking device 20 achieves the functions of a detection unit 21, a prediction unit 22, a first region setting unit 23, a selection unit 24, an estimation unit 25, a prohibition region setting unit 27, a registration prohibition unit 29, and a registration unit 30, and executes an object tracking process. The object tracking device 20 outputs target information generated by executing the object tracking process to the driving support device 50. Note that the object tracking process will be described in detail later.

The driving support device 50 uses the target information generated by the object tracking device 20, and state information and behavior information of the vehicle 80 obtained from various sensors mounted in the vehicle 80 to control the vehicle 80 and achieve driving support.

1-2. Processing

Next, the object tracking process that is executed by the object tracking device 20 according to the first embodiment will be described with reference to the flowchart in FIG. 3. The object tracking device 20 repeatedly executes this process at a specified cycle.

First, in S10, the detection unit 21 detects observed values for targets existing around the vehicle 80 from observation signals that are acquired from the radar device 10. The observed values include the electric power value of the observation signal, distance from the vehicle 80 to the target, orientation of the target with respect to the vehicle 80, and relative speed of the target with respect to the vehicle 80. Note that the observed values, instead of the relative speed of the target, may also include the ground speed of the target calculated from the relative speed and speed of the vehicle 80.

Next, in S20, the prediction unit 22 determines whether there is any unprocessed target information. More specifically, determines whether there are any registered targets for which the following process from S30 to S80 has not been performed. When it is determined that there is an unprocessed target, processing advances to S30.

In S30, the prediction unit 22 calculates a predicted value for a state quantity of the target in the current processing cycle based on an estimated value for the state quantity of the target calculated in the previous processing cycle. The predicted value for the state quantity of the target, as in the case of the observed value, may have the electric power value P of the observation signal, the distance R to the target, the orientation θ of the target, and the velocity Vr of the target as elements, or may have the electric power P of the observation signal, the X-axis coordinate value Cx, the Y-axis coordinate value Cy, the velocity Vx in the X direction, and the velocity Vy in the Y direction as elements. The X-axis is an axis along the width direction of the vehicle 80, the and the Y-axis is orthogonal to the X-axis and is an axis along the length direction of the vehicle 80. Moreover, the velocity Vr may be a relative velocity with respect to the vehicle 80, or may be the ground speed. The velocity Vx in the X direction may be the X-direction component of the relative velocity of the target with respect to the vehicle 80, or may be the X-direction component of the ground speed of the target. The velocity Vy in the Y direction may be the Y-direction component of the relative velocity of the target with respect to the vehicle 80, or may be the Y-direction component of the ground speed of the target.

Figure 5:
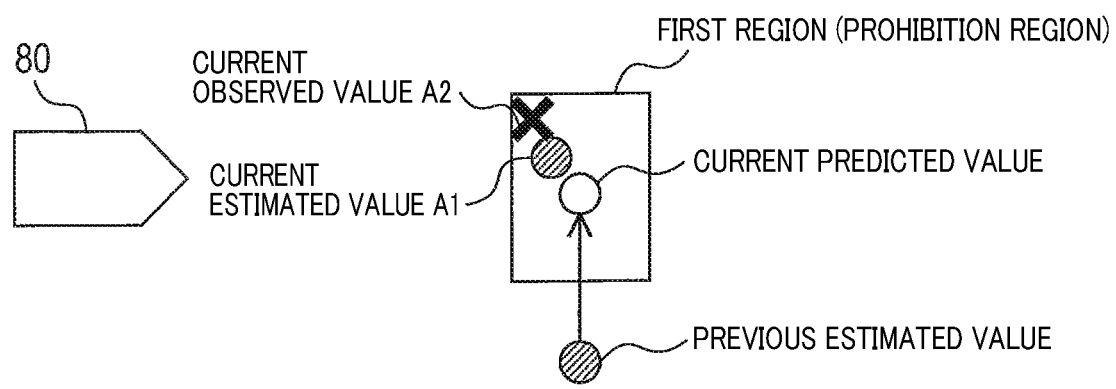
FIG. 5 is a diagram illustrating a first region for correlating a predicted value and an observed value, and a prohibition region for prohibiting registration of a new target according to the first embodiment.

Next, in S40, the first region setting unit 23 sets a first region based on at least one element of the predicted value calculated in S30. The first region is a region where it is estimated that the observed value will be acquired in the current processing cycle. An observed value that is detected from the same object as a predicted value should be a value close to the predicted value. Therefore, as illustrated in FIG. 5, a region centered on the predicted value calculated in S30 and where it is estimated that the observed value will be detected from the same object as the predicted value is set as the first region. The first region setting unit 23 sets the first region by presuming, for example, that the object is a vehicle in front that is traveling in the same direction as the vehicle 80. In this embodiment, a rectangular region centered on the predicted value is set as the first region based on two elements of the state quantity. A region based on three or more elements of the state quantity may also be set as the first region.

Next, in S50 the selection unit 24 executes a correlation process. The selection unit 24, from among the observed values detected in S10, selects an observed value to be correlated with the predicted value calculated in S30. More specifically, the selection unit 24 selects an observed value within the first region set in S40 and that is the closest observed value to the predicted value calculated in S30 as the observed value to be correlated with the predicted value. In the example illustrated in FIG. 5, an estimated value A1 and an observed value A2 are detected in the current processing cycle to be within the first region. Of the observed value corresponding to the estimated value A1 and the observed value A2, the observed value corresponding to the estimated value A1 is close to the predicted value, and therefore this observed value is selected to be the observed value that will be correlated with the predicted value. The observed value A2 is not correlated with the predicted value.

Next, in S60, the estimation unit 25, based on the predicted value calculated in S30 and the observed value selected to be correlated in S50, and using a Kalman filter, calculates an estimated value in the current processing cycle. The estimated value for the state quantity of the target may have the electric power value P of the observation signal, the distance R to the target, the orientation θ of the target, and the velocity Vr of the target as elements, or may have the electric power P of the observation signal, the X-axis coordinate value Cx, the Y-axis coordinate value Cy, the velocity Vx in the X direction, and the velocity Vy in the Y direction as elements. The estimated value of the state quantity may have elements that are the same as those of the observed value or the predicted value, or may have elements that are different from those of the observed value and the predicted value.

Next, in S70, the prohibition region setting unit 27 sets a prohibition region. The prohibition region is a region of observed values for which registration of new targets is prohibited. In this example, the first region set in S40 is taken to be a prohibition region.

Next. in S80, the registration prohibition unit 29 executes a registration prohibition determination process. More specifically, the registration prohibition unit 29 executes the subroutine illustrated in FIG. 4. First, in S200, the registration prohibition unit 29 determines whether there are any unprocessed observed values. More specifically, the registration prohibition unit 29 determines whether there are any observed values among the observed values detected in S10 that are not correlated with the predicted value and for which the following process from S210 to S220 has not been executed.

Here, a high-resolution radar may detect a plurality of observed values from the same object. One observed value from among the plurality of observed values is correlated with the predicted value in S340, and the remaining observed values exist as unprocessed observed values.

Moreover, in the current processing cycle, the observed value of the object that is detected first exists as an unprocessed observed value.

In S200, when it is determined that there are no unprocessed observed values, this subroutine ends and processing returns to S20. On the other hand, in S200, when it is determined that there is an unprocessed observed value, processing advances to S210.

In S210, the registration prohibition unit 29 determines whether one of the unprocessed observed values is an observed value that is within the prohibition region set in S70. In other words, the registration prohibition unit 29 determines whether an unprocessed observed value is an observed value of the plurality of observed values detected from the same object that is not correlated with the predicted value or is an observed value of an object that is detected for the first time. The prohibition region is a region for determining whether an observed value is an observed value detected from an object that is the same as the object corresponding to the predicted value.

In the example illustrated in FIG. 5, the observed value A2 is determined to be an observed value that is within the prohibition region. In S210, when it is determined that an observed value is an observed value within the prohibition region, processing advances to S220. On the other hand, in S210, when it is determined that an observed value is an observed value that is outside the prohibition region, processing returns to S200, and this subroutine is executed for the next unprocessed observed value.

In S220, the registration prohibition unit 29 sets a prohibition flag for observed values that were determined in S210 to be within the prohibition region. The prohibition flag is a flag for prohibiting the registration of an observed value as a new target.

For example, in addition to target T1 that is currently being tracked and that was generated for object O1, it is presumed that targets T2 and T3 are generated from observed values B1 and B2 that were detected from object O1. In the next and subsequent processing cycles, when two observed values C1 and C2 are detected from the object O1, three targets T1, T2 and T3 will compete for the two observed values C1 and C2. Then, when the predicted values for the targets T2 and T3 are correlated with the observed values C1 and C2, tracking of the target T1 ends, and tracking of targets T2 and T3 begins. Therefore, it becomes impossible to continue to track the target T1. In other words, in a case where a plurality of targets is generated from one object and a number of observed values less than the number of targets are detected in the subsequent processing cycles, it may become impossible to continuously track the targets.

Therefore, in order that a plurality of targets is not generated from the same target, prohibition flags are set for observed values among the plurality of observed values that are estimated as being detected from the same object and that are correlated with the predicted value. In the example illustrated in FIG. 5, a prohibition flag is set for the observed value A2.

However, the registration prohibition unit 29 does not set prohibition flags for observed values of the observed values determined in S210 to be observed values within the prohibition region and whose distance to the target is equal to or less than a preset distance threshold value. The registration prohibition unit 29 stops prohibiting the registration of observed values detected from an object at a relatively close distance from the vehicle 80 as new targets. In other words, at distances relatively close to the vehicle 80, the registration prohibition unit 29 prioritizes the performance of generating targets over prohibiting the generation of a plurality of targets from one object. After that, processing returns to S200.

Figure 3:
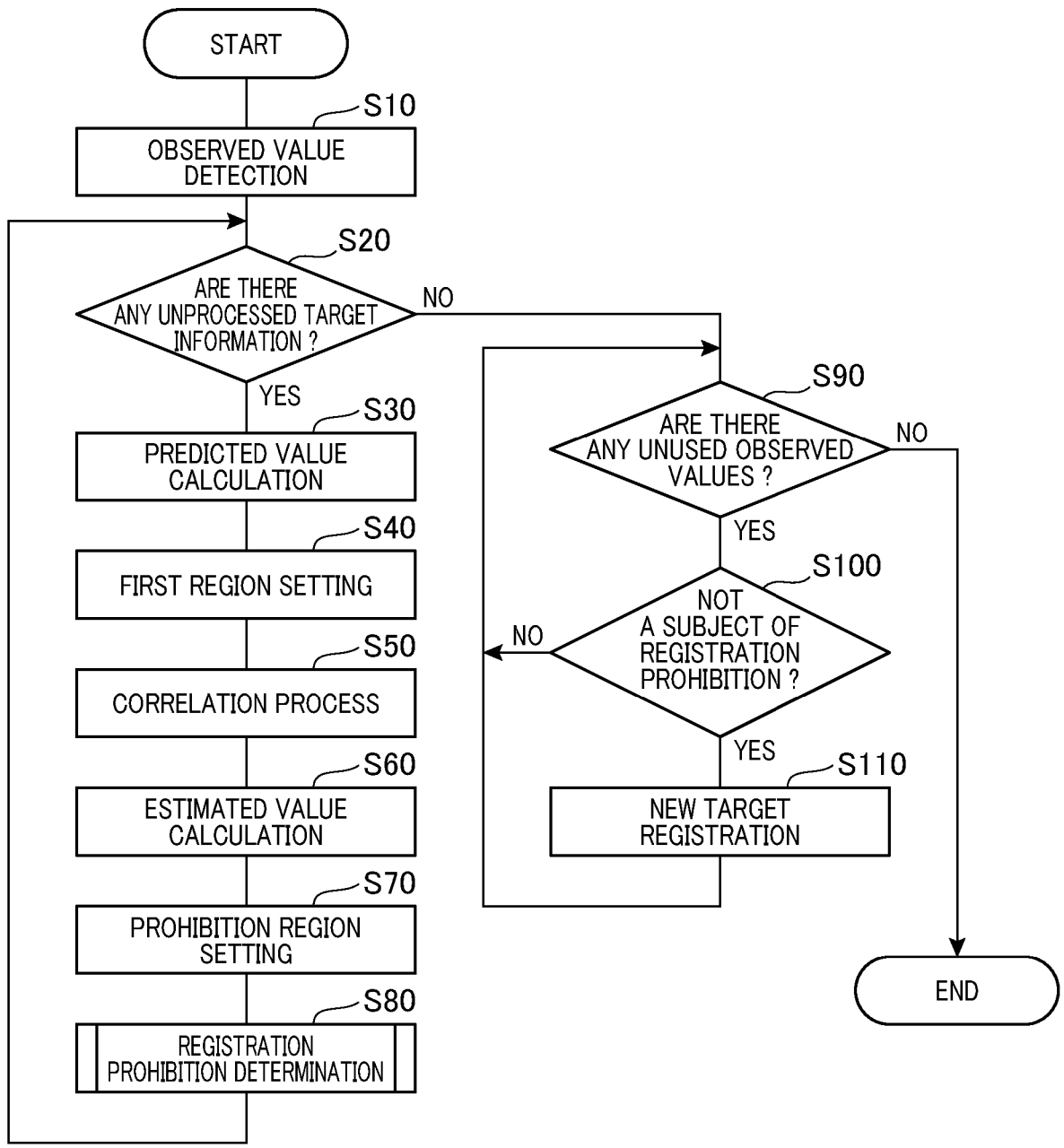
FIG. 3 is a flowchart illustrating an object tracking process executed by the object tracking device according to the first embodiment.
Figure 4:
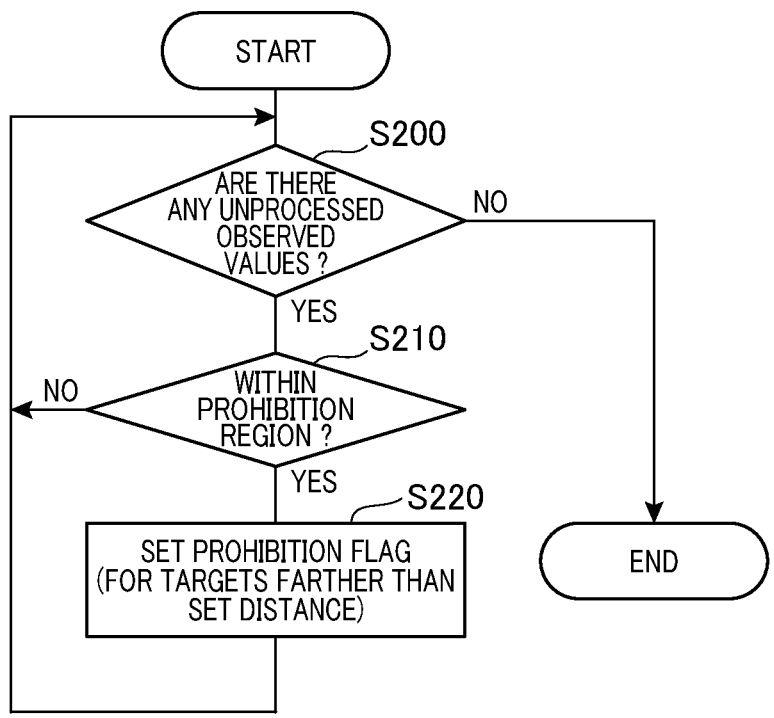
FIG. 4 is a flowchart of a subroutine illustrating a registration prohibition determination process executed by the object tracking device according to the first embodiment.

After the subroutine illustrated in FIG. 4 is completed, processing returns to the process of S20 in the object tracking process illustrated in FIG. 3. Then, as long as there is unprocessed target information, the process from S20 to S80 is repeatedly executed. On the other hand, when there is no longer any unprocessed target information, and it is determined in S20 that there is no unprocessed target information, processing advances to S90.

In S90, the registration unit 30 determines whether there are any unused observed values among the observed values detected in S10. In other words, the registration unit 30 determines whether there are any observed values among the observed values detected in S10 that are not correlated with a predicted value. In S90, when it is determined that there are no unused observed values, this process ends. On the other hand, in S90, when it is determined that there is an unprocessed observed value, processing advances to S100.

In S100, the registration unit 30 determines whether one of the unused observed values is an observed value for which registration is not prohibited. More specifically, when a prohibition flag is set for an observed value, it is determined that registration of that observed value is prohibited, and when a prohibition flag is not set for an observed value, it is determined that registration of that observed value is not prohibited.

In S100, when it is determined that registration of the observed value is prohibited, processing returns to S90, and when it is determined that registration of the observed value is not prohibited, processing advances to S110.

In S110, the registration unit 30 registers the observed value for which registration is not prohibited as a new target. After that, processing returns to S90, and as long as there are unused observed values the have not undergone the process from S90 to S110, the process from S90 to S110 is repeatedly executed. This process is then completed.

1-3. Effects

With the first embodiment described above, the following effects are obtained.

(1) For each target, a predicted value for the current state quantity is calculated based on an estimated value of the past state quantity, and for each calculated predicted value, a first region is set based on the predicted value. Then, of acquired observed values, an observed value is selected from among the observed values within the first region to be correlated with the predicted value, and based on the selected observed value and predicted value, an estimated value is calculated for the current state quantity. Furthermore, a prohibition region is set for each predicted value, and of the acquired observed values, an observed value that is not correlated with any of the predicted values and that is outside the prohibition region is registered as a new target. On the other hand, even in the case of an observed value that is not correlated with any predicted value, there is a high probability that an observed value that is within the prohibition region was observed from the same object as an observed value that is correlated with a predicted value. Accordingly, an observed value that is within the prohibition region is prohibited from being registered as a new target. Therefore, it is possible to prohibit the generation of a plurality of targets from the same object. As a result, it is possible to stably track a target.

(2) There is a high probability that observed values that are within the first region, which is a region of observed values correlated with a predicted value, that are not correlated with a predicted value are observed values that were observed from the same object as an observed value that is correlated with a predicted value. Therefore, by setting the first region as a prohibition region, it is possible to properly prohibit the generation of a plurality of targets from the same object.

(3) It is possible to set a region of observed values to be correlated with a predicted value, and to set a region of observed values to be prohibited from being registered as new targets based on physical quantities that are observable by a radar device 10.

(4) An observed value that is at a short distance less than a distance threshold value from the vehicle 80 is not prohibited from being registered as a new target even though the observed value is within a prohibition region. As a result, at short distances, target performance is prioritized over prohibiting the generation of a plurality of targets from the same object.

Second Embodiment 2-1. Differences from the First Embodiment

The basic configuration of a second embodiment is similar to that of the first embodiment, and thus a description of configuration that is similar between the two will be omitted, and the description will be centered on the differences. Note that reference signs that are the same as those in the first embodiment indicate identical configuration and reference the preceding description.

Figure 2:
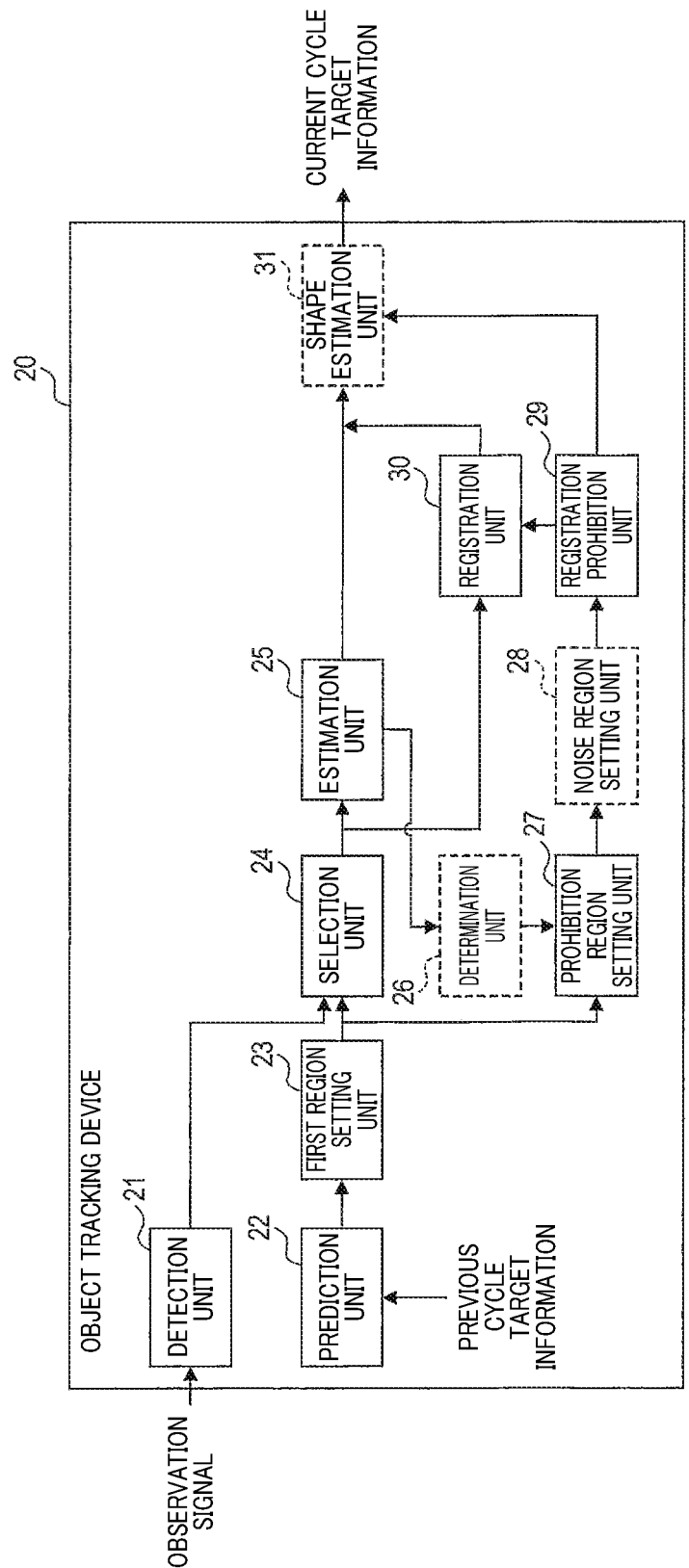
FIG. 2 is a block diagram illustrating the configuration of an object tracking device according to the first embodiment.

As indicated by the dashed lines in FIG. 2, the object tracking device 20 according to the second embodiment differs from the object tracking device 20 according to the first embodiment in that in addition to the function of the object tracking device 20 according to the first embodiment, functions of a determination unit 26, a noise region setting unit 28, and a shape estimation unit 31 are further achieved. The determination unit 26, the noise region setting unit 28 and the shape estimation unit 31 will be described in detail later.

2-2. Processing

Figure 6:
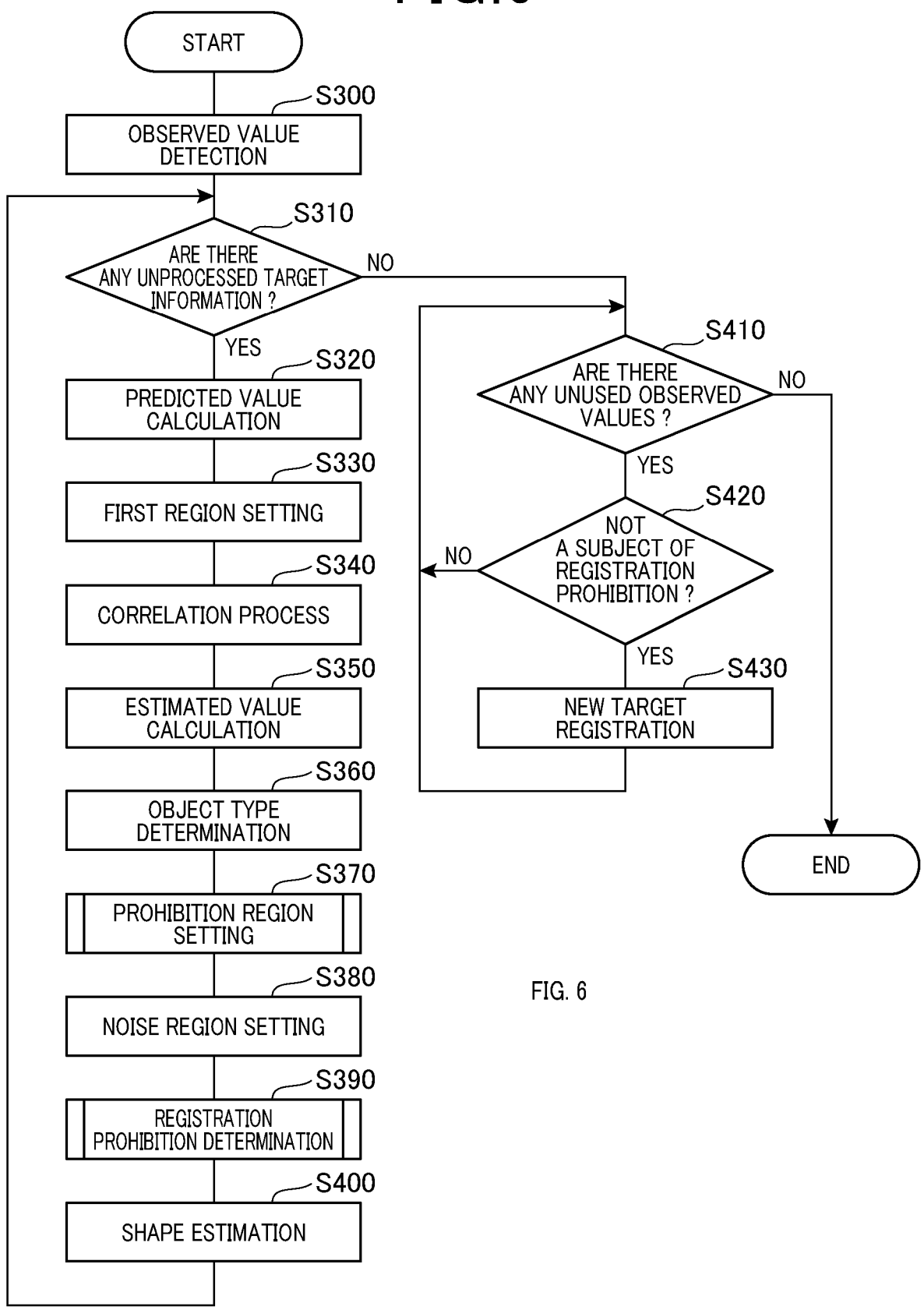
FIG. 6 is a flowchart illustrating an object tracking process executed by the object tracking device according to a second embodiment.

Next, the object tracking process that is executed by the object tracking device 20 according to the second embodiment will be described with reference to the flowchart in FIG. 6. The object tracking device 20 repeatedly executes this process at a specified cycle.

First, in S300 to S350, the object tracking device 20 executes the same processing as in S10 to S60.

Next, in S360, the determination unit 26 determines the type of object corresponding to the target. More specifically, the determination unit 26 determines the type of object using any one of an observed value, an estimated value, and a predicted value of the velocity Vr, the distance R, and the orientation θ of the target. Instead of the velocity Vr, the distance R, and the orientation θ, it is also possible to use the X-axis coordinate value Cx, the Y-axis coordinate value Cy, the velocity Vx in the X direction, and the velocity Vy in the Y direction. Types of objects include pedestrians, bicycles crossing in front of the vehicle 80, and automobiles crossing in front of the vehicle 80.

Next, in S370, the prohibition region setting unit 27 sets a prohibition region according to the type of object determined in S360. More specifically, the prohibition region setting unit 27 executes the subroutine illustrated in FIG. 7.

First, in S500, the prohibition region setting unit 27 determines whether the type of object is a pedestrian. In S500, when it is determined that the type of object is a pedestrian, processing advances to the process of SS10.

Figure 9:
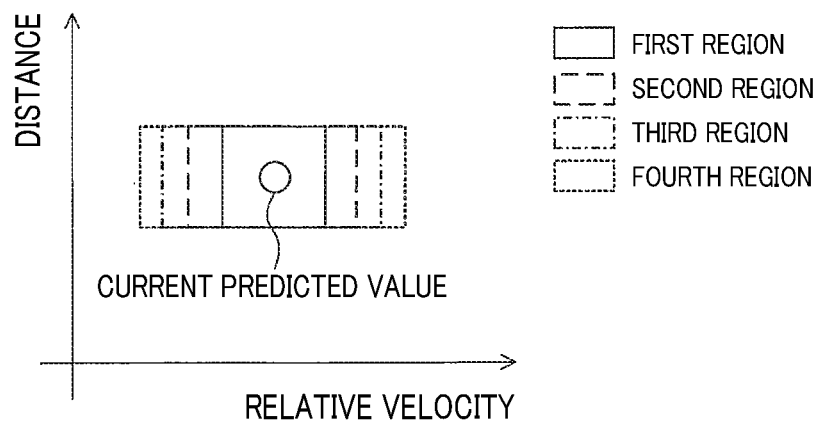
FIG. 9 is a diagram illustrating a different example of first to fourth regions that are prohibition regions for prohibiting registration of a new target according to the second embodiment.

In SS10, as illustrated in FIG. 8 and FIG. 9, the prohibition region setting unit 27 sets a second region that is larger than the first region as a prohibition region. A pedestrian swings his/her arms and legs, and thus the spread of the velocity Vr, or the velocity Vx in the X direction and the velocity Vy in the Y direction is greater than that of a vehicle in front. Therefore, the second region is a region in which the spread of the region of velocity Vr, or the region of velocity Vx in the X direction and velocity Vy in the Y direction is larger than in the first region. After the process of SS10, this subroutine ends and processing advances to S380.

Moreover, in S500, when it is determined that the type of object is not a pedestrian, processing advances to S520. In S520, the prohibition region setting unit 27 determines whether the type of object is a crossing bicycle. In S520, when it is determined that the type of object is a crossing bicycle, processing advances to S530.

In S530, as illustrated in FIG. 8 and FIG. 9, the prohibition region setting unit 27 sets a third region that is larger than the first region as a prohibition region. A crossing bicycle has a length in the width direction of the vehicle 80 that is longer than that of a vehicle in front, and thus the spread of the orientation θ, or the spread of the X-axis coordinate value Cx is larger than that of a vehicle in front. Therefore, the third region is a region in which the spread of the region of orientation θ, or the region of the X-axis coordinate value Cx is larger than that in the first region. After the process of S530, this subroutine ends and processing advances to S380.

Moreover, in S520, when it is determined that the type of object is not a crossing bicycle, processing advances to S540. In S540, the prohibition region setting unit 27 determines whether the type of object is a crossing automobile. In S540, when it is determined that the type of object is a crossing automobile, processing advances to S550.

In S550, as illustrated in FIG. 8 and FIG. 9, the prohibition region setting unit 27 sets a fourth region that is larger than the third region as a prohibition region. An automobile crossing in front has a length in the width direction of the vehicle 80 that is longer than that of a crossing bicycle, and thus the spread of the orientation θ, or the spread of the X-axis coordinate value Cx is larger than that of a crossing bicycle. Therefore, the fourth region is a region in which the spread of the region of orientation θ, or the region of the X-axis coordinate value Cx is larger than that in the third region. After the process of S550, this subroutine ends and processing advances to S380. On the other hand, in S540, when it is determined that the type of the object is not a crossing automobile, the first region is set as the prohibition region, then this subroutine ends, and processing advances to S380.

Figure 10:
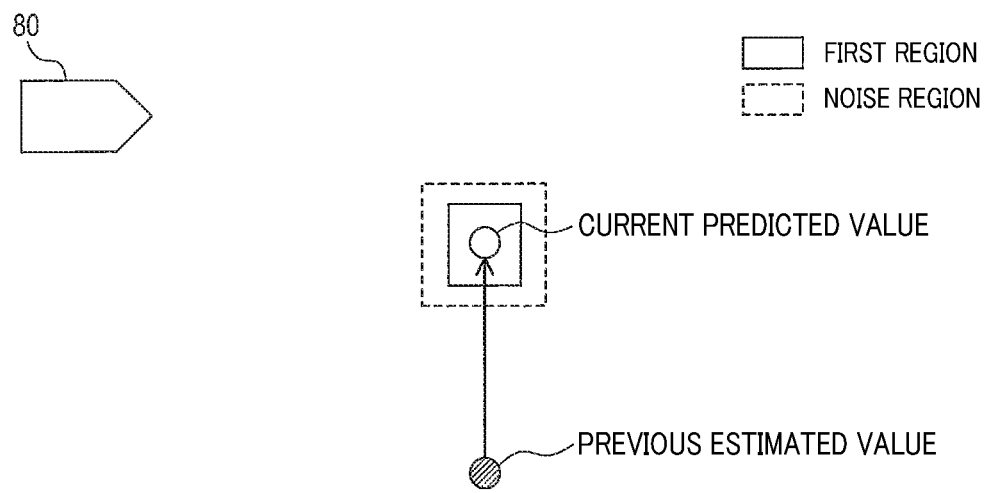
FIG. 10 is a diagram illustrating a first region that is a prohibition region for prohibiting the registration of a new target, and a noise region for prohibiting the registration of noise according to the second embodiment.
Figure 11:
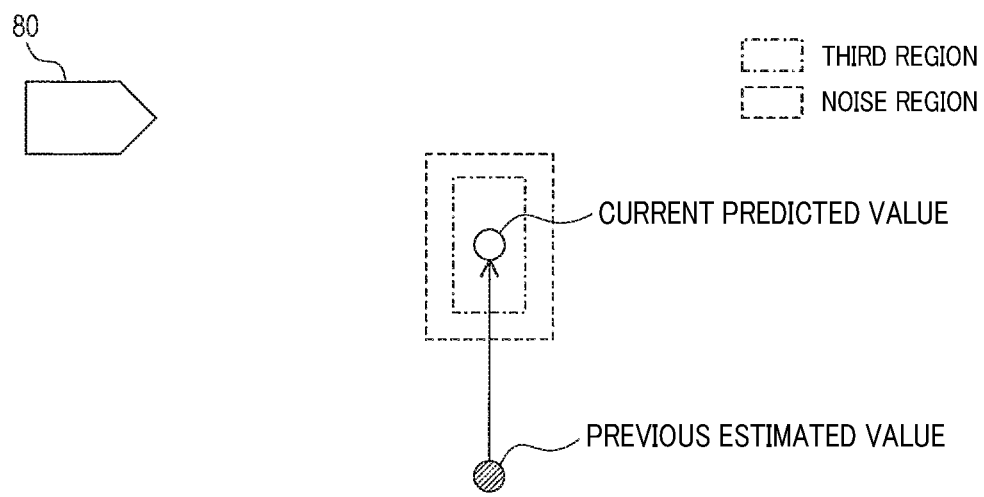
FIG. 11 is a diagram illustrating a third region that is a prohibition region for prohibiting the registration of a new target, and a noise region for prohibiting the registration of noise according to the second embodiment.

Next, in S380, the noise region setting unit 28 sets a noise region for predicted values calculated in S320. A noise region is a region for prohibiting the registration of a noise peak as a new target. As illustrated in FIG. 10 and FIG. 11, a noise region is a region larger than a prohibition region set in S370. Of the observed values outside of the prohibition region and within the noise region, a prohibition flag is set for an observed value for which the electric power difference between the electric power value P included in the observed value and the electric power value P included in the predicted value is greater than or equal to a preset electric power threshold value. As a result, a noise peak that is detected near the object is prohibited from being registered as a new target.

Next, in S390, the same process as in S80 is executed.

Figure 12:
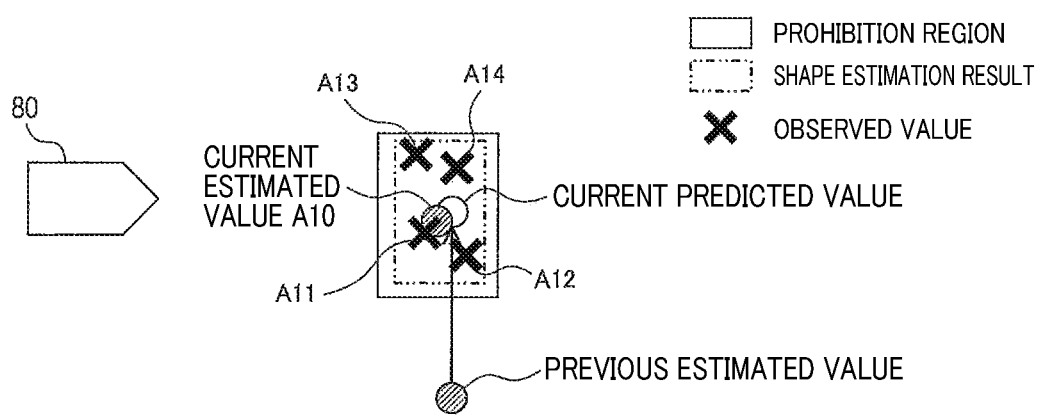
FIG. 12 is a diagram illustrating a state of estimating a shape of a target according to the second embodiment.

Next, in S400, the shape estimation unit 31 estimates the shape of the object indicated by the predicted value calculated in S320. More specifically, as illustrated in FIG. 12, before the current processing cycle, the shape estimation unit 31 estimates the shape of the object by using observed values that are prohibited from being registered as a new target. In other words, of the observed values that are within the prohibition region set for the predicted value, information about observed values that are not correlated with the predicted value is stored in memory in the subsequent processing cycles. Then, in subsequent processing cycles, the shape estimation unit 31 estimates the shape of the object based on the positions of all of the stored observed values that are correlated with the predicted value.

In the example illustrated in FIG. 12, estimated value A10 detected in the current processing cycle, and observed values A11 to A14 that have been prohibited from being registered as new targets in the previous processing cycle are within the prohibition region set in S370. In this case, the shape estimation unit 31 estimates the shape of the object based on the positions of the stored observed values A11 to A14. Observed values that have been prohibited from being registered as new targets in the current processing cycle may also be included in the observed values A11 to A14. The information of observed values A11 to A14 is also stored for the next subsequent processing cycles.

Next, in S410 to S430, the same processing as in S90 to S110 is executed. This process is then completed.

2-3. Effects

With the second embodiment described above, the following effects are obtained together with the effects (1) to (4) of the first embodiment described above.

(5) The type of object corresponding to the target is determined, and a prohibition region is set according to the type of object. Therefore, it is possible to set a proper prohibition region according to the type of object.

(6) A pedestrian swings his/her arms and legs, and thus the spread of the velocity Vr, or the velocity Vx in the X direction and the velocity Vy in the Y direction is greater than that of a vehicle in front. Therefore, when it is determined that the type of object is a pedestrian, the region of velocity Vr of the prohibition region, or the region of the velocity Vx in the X direction and the velocity Vy in the Y direction is larger than in the first region. As a result, when the type of object is a pedestrian, it is possible to properly prohibit a plurality of targets from being generated from the same object.

(7) A crossing bicycle has a length in the width direction of the vehicle 80 that is larger than a vehicle in front, and thus when it is determined that the type of object is a crossing bicycle, the region in the width direction or the region of the orientation θ of the vehicle 80 in the prohibition region is larger. As a result, when the type of object is a crossing bicycle, it is possible to properly prohibit a plurality of targets from being generated from the same object.

(8) A crossing automobile has a length in the width direction of the vehicle 80 that is even longer than that of a crossing bicycle, and thus when it is determined that the type of object is a crossing automobile, the region in the width direction or the region of the orientation θ of the vehicle 80 in the prohibition region is even larger. As a result, when the type of object is a crossing automobile, it is possible to properly prohibit a plurality of targets from being generated from the same object.

(9) Of the observed values outside of the prohibition region and within the noise region, an observed value for which the electric power difference between the electric power value P included in the observed value and the electric power value P included in the predicted value is greater than or equal to a preset electric power threshold value is prohibited from being registered as a new target. Therefore, even observed values that are outside of the prohibition region can be prohibited from being registered as a new target when the noise peak is near the object.

(10) For the same predicted value, observed values that have been prohibited from being registered as new targets are observed from different positions of the same object as an observed value that is correlated with the predicted value. Therefore, it is possible to detect positions of a plurality of positions within the same object and estimate the shape of the object by storing a plurality of observed values that have been prohibited from being registered as new targets, and using the plurality of stored observed values. In other words, it is possible to effectively use observed values that have been prohibited from being registered as new targets.

OTHER EMBODIMENTS

Forms for implementing the present disclosure have been described above; however, the present disclosure is not limited to the embodiments described above, and may undergo various modifications.

Figure 13:
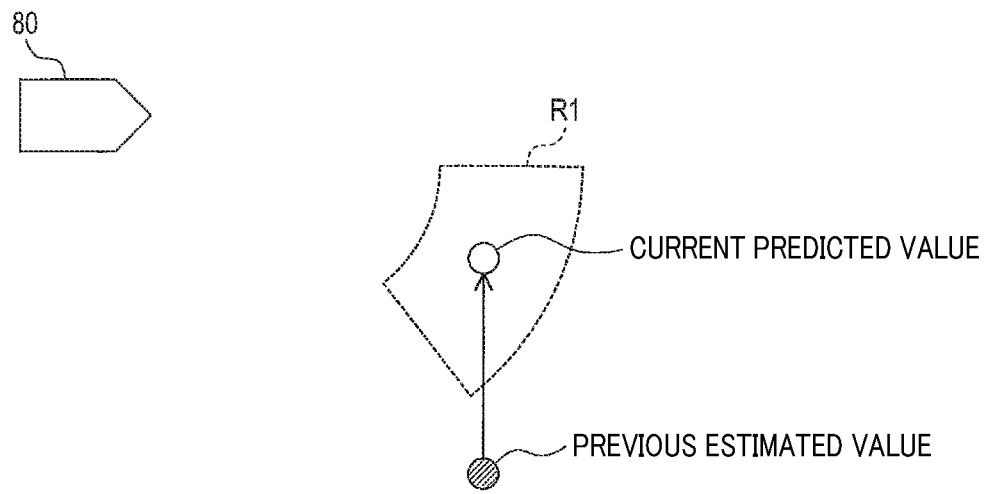
FIG. 13 is a diagram illustrating the shape of the first region, the prohibition region, and the noise region according to another embodiment.
Figure 14:
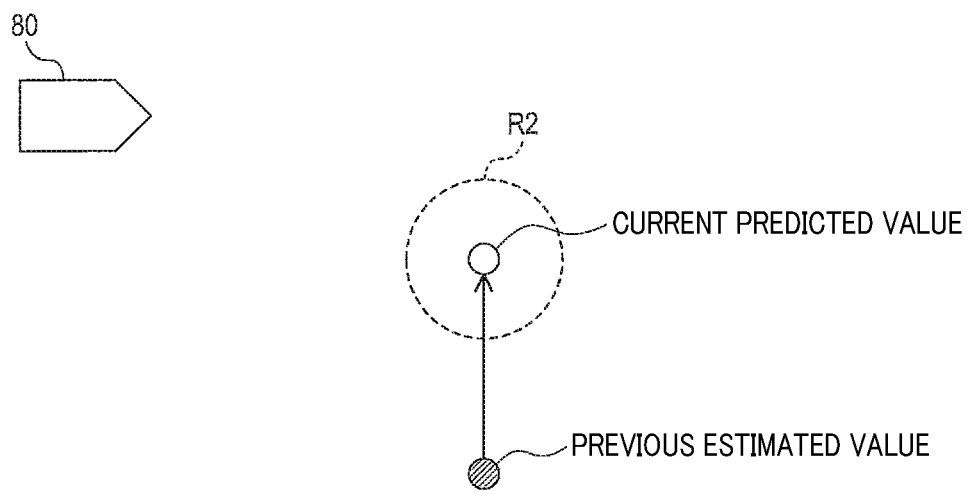
FIG. 14 is a diagram illustrating the shape of the first region, the prohibition region, and the noise region according to another embodiment.

(a) In the embodiments described above, the first region and prohibition region are set as rectangular regions; however, the shape of the regions are not limited to being rectangular. For example, the first region and the prohibition region may be set to be a shape such as region R1 illustrated in FIG. 13, or may be set to be a shape such as region R2 illustrated in FIG. 14.

(b) The object tracking device 20 and methods described in the present disclosure may be achieved by a dedicated computer that is provided by configuring a processor and memory programmed to execute one or a plurality of functions embodied by a computer program. Alternatively, the object tracking device 20 and methods described in the present disclosure may be achieved by a dedicated computer that is provided by configuring a processor using one or more dedicated hardware logic circuits. Moreover, the object tracking device 20 and methods described in the present disclosure may be achieved by one or more dedicated computers configured by a combination of processors and memory that execute one or a plurality of functions, and one or more hardware logic circuits. Furthermore, the computer program may be stored in a computer-readable, non-transitory tangible storage medium as instructions to be executed by a computer. The methods for achieving the functions of each part included in the object tracking device 20 does not necessarily need to include software, and all of the functions may be realized using one or a plurality of kinds of hardware.

(c) A plurality of functions of one component in the above embodiment may be realized by a plurality of components, or a single function of one component may be achieved by a plurality of components. Moreover, a plurality functions of a plurality of components may be achieved by a single component, or a single function achieved by a plurality of components may be achieved by a single component. It is also possible to omit part of the configuration of the embodiments described above. Furthermore, at least part of the configuration of the embodiments described above can be added to or substituted for other embodiments described above.

(c) In addition to the object tracking device 20 described above, the present disclosure can be achieved in various forms, such as a system including the object tracking device 20, a program for making a computer function as the object tracking device 20, a non-transitory tangible storage medium such as semiconductor memory on which the program is recorded, and an object tracking method.

What is claimed is:

1. An object tracking device that estimates a state quantity of at least one target for each preset processing cycle; comprising:
   a detection unit configured to detect at least one observed value from an observation signal observed by a sensor, the at least one observed value being information about the at least one target around a vehicle;
   a prediction unit configured to calculate a predicted value of a current state quantity from an estimated value of a past state quantity for each target included in the at least one target;
   a first region setting unit configured to set a first region based on the predicted value for each predicted value calculated by the prediction unit, the first region being a region where it is estimated the at least one observed value will be obtained this time;
   a selection unit configured to select an observed value from the at least one observed value detected by the detection unit for each predicted value calculated by the prediction unit, the observed value being within the first region set by the first region setting unit;
   an estimation unit configured to calculate the estimated value of the current the state quantity based on the observed value selected by the selection unit for each predicted value calculated by the prediction unit;
   a registration unit configured to register the observed value of the at least one observed value detected by the detection unit that is not correlated with any predicted value as a new target;
   a prohibition region setting unit configured to set a prohibition region for each predicted value calculated by the prediction unit, the prohibition region being a region of the observed values that are prohibited from being registered as new targets; and
   a registration prohibition unit configured to prohibit the observed values of the at least one observed value detected by the detection unit within the prohibition region set by the prohibition region setting unit from being registered as the new targets by the registration unit.

2. The object tracking device according to claim 1, wherein
   the prohibition region setting unit sets the first region as the prohibition region.

3. The object tracking device according to claim 1, wherein
   the predicted value includes a first-axis coordinate value of the target, a second-axis coordinate value of the target, a first velocity in the first-axis direction of the target, a second velocity in the second-axis direction of the target, or the distance to the target, the orientation of the target and the velocity of the target;
   the first region setting unit is configured to set the first region based on at least one element included in the predicted value; and
   the prohibition region setting unit is configured to set the prohibition region based on at least one element included in the predicted value.

4. The object tracking device according to claim 3, further comprising
   a determination unit configured to determine a type of object indicated by the target; wherein
   the prohibition region setting unit is configured to set the prohibition region according to the type of the object determined by the determination unit.

5. The object tracking device according to claim 4, wherein
   in a case where the determination unit determines that the type of the object is a pedestrian, the prohibition region setting unit is configured to set a second region that is larger than the first region as the prohibition region for the first velocity and the second velocity, or for the velocity of the target.

6. The object tracking device according to claim 4, wherein
   the sensor is mounted in the vehicle;
   the first axis is an axis in the width direction of the vehicle; and
   in a case where the determination unit determines that the type of the object is a crossing bicycle, the prohibition region setting unit is configured to set a third region that is larger than the first region as the prohibition region for the first-axis coordinate value or the orientation of the target.

7. The object tracking device according to claim 6, wherein
   in a case where the determination unit determines that the type of the object is a crossing automobile, the prohibition region setting unit is configured to set a fourth region that is larger than the third region as the prohibition region for the first-axis coordinate value or the orientation of the target.

8. The object tracking device according to claim 1, wherein
   the state quantity includes an electric power value of the observation signal from the sensor;
   the object tracking device further comprises a noise region setting unit configured to set a noise region that is larger than the prohibition region for each predicted value calculated by the prediction unit; and
   the registration prohibition unit is configured to prohibit an observed value of the at least one observed value detected by the detection unit and for which a difference in electric power between the electric power value included in the observed value and the electric power value included in the predicted value is equal to or greater than an electric power threshold value from being registered by the registration unit as the new target.

9. The object tracking device according to claim 1, further comprising
   a shape estimation unit configured to store information about the observed value, prohibited from being registered as the new target by the registration prohibition unit for each predicted value calculated by the prediction unit, in following processing cycles, and configured to estimate a shape of an object indicated by the prediction unit using the observed values that are stored.

10. The object tracking device according to claim 1, wherein in a case where the distance to the target is equal to or less than a distance threshold value, the registration prohibition unit is configured to stop prohibiting the observed values within the prohibition region from being registered as new targets.

* * * * *